United States Patent
Yeh

(10) Patent No.: US 9,533,752 B2
(45) Date of Patent: Jan. 3, 2017

(54) INPUT CONGRUENCE SYSTEM FOR FLIGHT CONTROL SURFACES

(71) Applicant: The Boeing Company, Chicago, IL (US)

(72) Inventor: Ying Chin Yeh, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 164 days.

(21) Appl. No.: 14/332,514

(22) Filed: Jul. 16, 2014

(65) Prior Publication Data
US 2016/0016655 A1    Jan. 21, 2016

(51) Int. Cl.
| G01C 23/00 | (2006.01) |
| G05D 1/00 | (2006.01) |
| G05D 3/00 | (2006.01) |
| G06F 7/00 | (2006.01) |
| G06F 17/00 | (2006.01) |
| G06F 7/70 | (2006.01) |
| G06F 19/00 | (2011.01) |
| G06G 7/00 | (2006.01) |
| G06G 7/76 | (2006.01) |
| G08B 21/00 | (2006.01) |
| B64C 13/50 | (2006.01) |
| G06F 11/07 | (2006.01) |

(52) U.S. Cl.
CPC ............ *B64C 13/503* (2013.01); *G05D 1/0055* (2013.01); *G06F 11/079* (2013.01); *G06F 11/0739* (2013.01); *G06F 11/0751* (2013.01); *Y02T 50/44* (2013.01)

(58) Field of Classification Search
None
See application file for complete search history.

(56) References Cited

U.S. PATENT DOCUMENTS

| 5,802,077 A | 9/1998 | Yeh |
| 7,852,235 B1 | 12/2010 | Johnson et al. |
| 8,015,390 B1 | 9/2011 | Corcoran et al. |
| 8,761,969 B2 * | 6/2014 | Sghairi ............... B64C 13/24 701/4 |
| 8,928,497 B2 * | 1/2015 | Camus ............. G05B 23/0227 307/10.1 |
| 2005/0085957 A1 | 4/2005 | Yeh |
| 2010/0318245 A1 | 12/2010 | Nakagawa et al. |

FOREIGN PATENT DOCUMENTS

| WO | WO2007018652 A1 | 2/2007 |
| WO | WO2008122820 A2 | 10/2008 |

OTHER PUBLICATIONS

Extended European Search Report, dated Dec. 15, 2015, regarding Application No. EP15176606.0, 11 pages.
Canadian Office Action mailed Apr. 28, 2016, regarding application No. 2891307, 3 pages.

* cited by examiner

*Primary Examiner* — Fadey Jabr
*Assistant Examiner* — Lail Kleinman
(74) *Attorney, Agent, or Firm* — Yee & Associates, P.C.

(57) ABSTRACT

A method and apparatus for controlling flight control surfaces on an aircraft. Commands are sent onto a data bus system from flight control modules. The flight control modules and actuator control modules determine whether an error is present in the commands sent onto the data bus system. Point-to-point connections between the flight control modules and the actuator control modules are managed based on whether the error is present in the commands sent onto the data bus system.

20 Claims, 13 Drawing Sheets

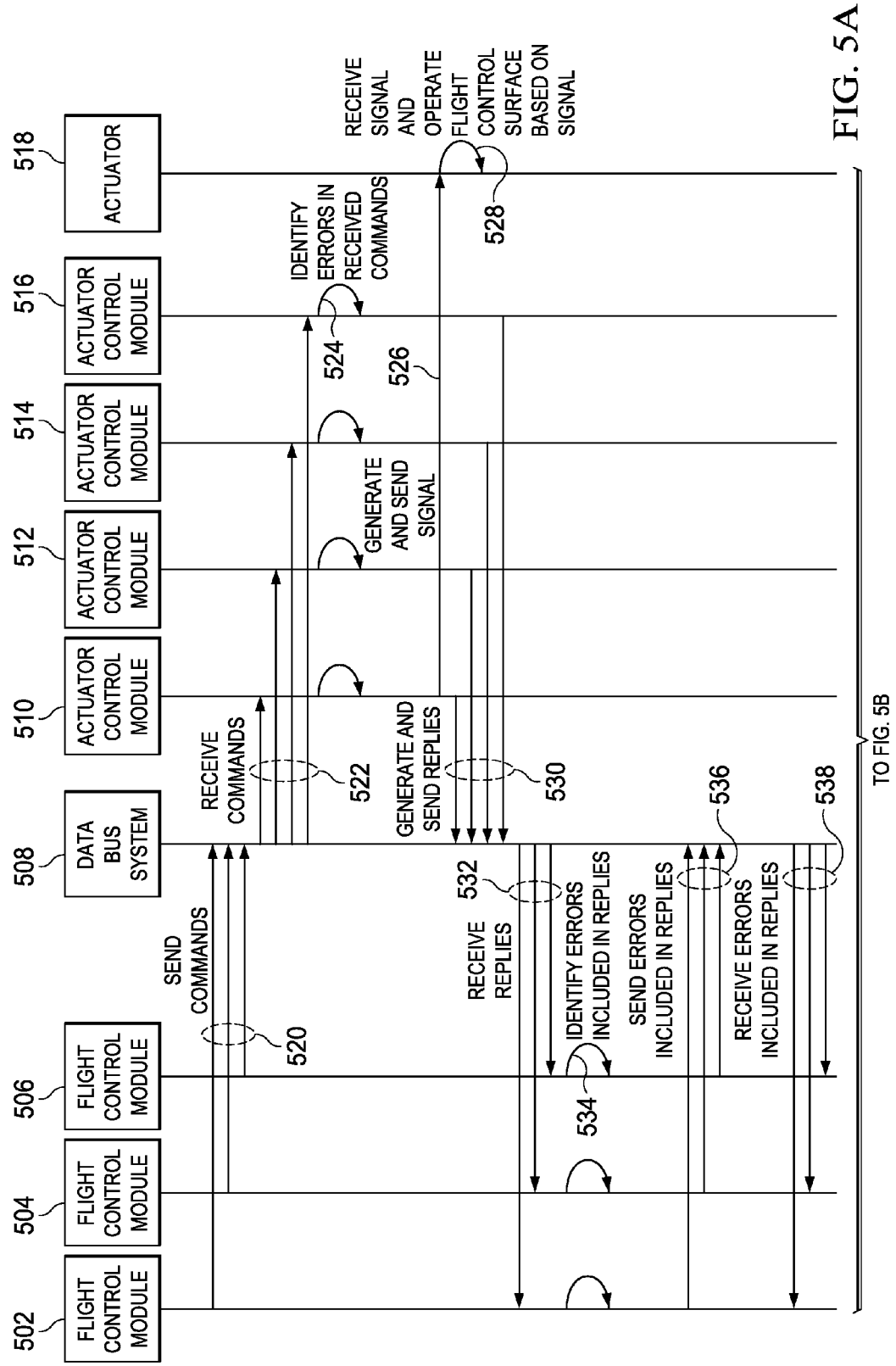

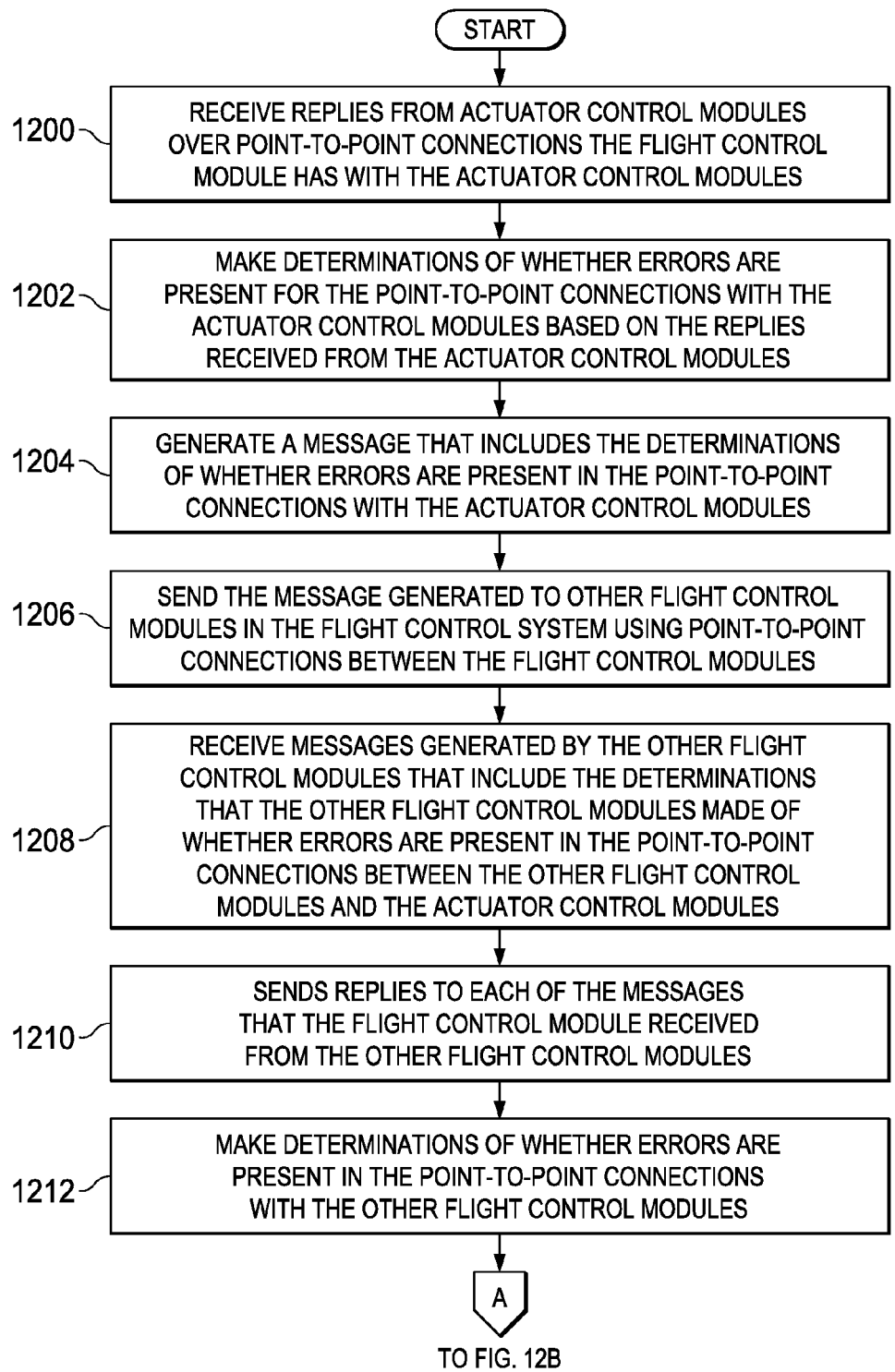

INPUT CONGRUENCE SYSTEM FOR FLIGHT CONTROL SURFACES

BACKGROUND INFORMATION

1. Field

The present disclosure relates generally to aircraft and, in particular, to controlling movement of the aircraft. Still more particularly, the present disclosure relates to a method and apparatus for controlling the position of flight control surfaces on an aircraft to control movement of the aircraft.

2. Background

A fly-by-wire (FBW) system for an aircraft is a system that replaces the conventional manual flight controls of an aircraft with an electronic interface. The flight controls in the cockpit are not connected to the flight control surfaces, engines, or other systems by cables, linkages, or other mechanical systems, as with more conventional aircraft. Instead, the movements of flight controls are converted to electronic signals transmitted by wires, optical fibers, over an air-interface, or some combination thereof.

For example, flight control computers in a fly-by-wire system use these signals to identify how to move the actuators for each flight control surface to provide the response to the movement of the flight controls. Further, the flight control computers also may perform functions without input from a pilot. For example, the flight control computers may automatically help stabilize the flight aircraft without needing input from the pilot. The flight control computers generate commands to control flight control surfaces, an engine, or other devices that control movement of the aircraft.

An aircraft with a fly-by-wire system can be lighter in weight than when using conventional controls. Also, the electronic systems in a fly-by-wire system require less maintenance as compared to mechanical systems and hydraulic systems.

Redundancy is present in fly-by-wire systems for aircraft. Multiple flight control modules in the fly-by-wire system are used to generate commands in response to receiving signals from the movement of flight control-external sensing devices. The redundancy takes into account that a flight control module may not always perform as desired.

The different components in a fly-by-wire system may communicate with each other using different types of communications architectures. For example, some fly-by-wire systems use wires that connect the components directly to each other. In this example, multiple wires can be used to provide redundant connections between the components.

In other examples, a fly-by-wire system may use a data bus, such as those used in computer systems. The data bus may reduce the amount of wiring between components. Depending on the amount of traffic on the data bus, commands may reach intended components later than desired. This situation is a timing issue in which commands sent to a component, such as an actuator control module, may not reach the component within a desired amount of time. As a result, the fly-by-wire system may not provide for a desired level of performance in the aircraft.

For example, the delays in inputs to control an engine may result in lower than desired fuel efficiency. Delays in inputs for controlling a flight control surface result in degraded human-machine handling quality and the aircraft generating greater noise than desired or lower passenger comfort.

Therefore, it would be desirable to have a method and apparatus that take into account at least some of the issues discussed above, as well as other possible issues. For example, it would be desirable to have a method and apparatus that reduce issues that may be caused by inputs having delays in reaching components.

SUMMARY

In one illustrative embodiment, an apparatus comprises a data bus system in an aircraft, actuator control modules connected to the data bus system, and flight control modules connected to the data bus system. An actuator control module in the actuator control modules controls positioning of a group of flight control surfaces on the aircraft using commands on the data bus system that are directed to the actuator control module. The flight control modules generate and send the commands onto the data bus system to control the flight control surfaces on the aircraft. The commands for a flight control surface are directed towards a group of the actuator control modules assigned to the flight control surfaces. The actuator control modules and the flight control modules determine whether an error is present in the commands sent onto the data bus system by the flight control modules.

In another illustrative embodiment, a flight control system comprises a data bus system in an aircraft, actuator control modules connected to the data bus system, and flight control modules connected to the data bus system. An actuator control module in the actuator control modules controls positioning of a group of flight control surfaces on the aircraft using commands on the data bus system directed to the actuator control module. Each of the flight control modules generates and sends the commands onto the bus system to control the flight control surfaces on the aircraft. Commands for a flight control surface are directed towards the actuator control modules assigned to the flight control surface. The actuator control modules and the flight control modules determine whether an error is present in the commands sent onto the data bus system and manage point-to-point connections between the flight control modules and the actuator control modules based on the error identified in the commands.

In yet another illustrative embodiment, a method for controlling flight control surfaces on an aircraft is presented. Commands are sent onto a data bus system from flight control modules. The flight control modules and actuator control modules determine whether an error is present in the commands sent onto the data bus system. Point-to-point connections between the flight control modules and the actuator control modules are managed based on whether the error is present in the commands sent onto the data bus system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 5A and 5B are illustrations of a flowchart of a process for processing commands in a flight control environment in accordance with an illustrative embodiment;

FIGS. 12A and 12B are illustrations of a flowchart of a process for identifying whether errors are present in a flight control system in accordance with an illustrative embodiment;

DETAILED DESCRIPTION

Figure 1:
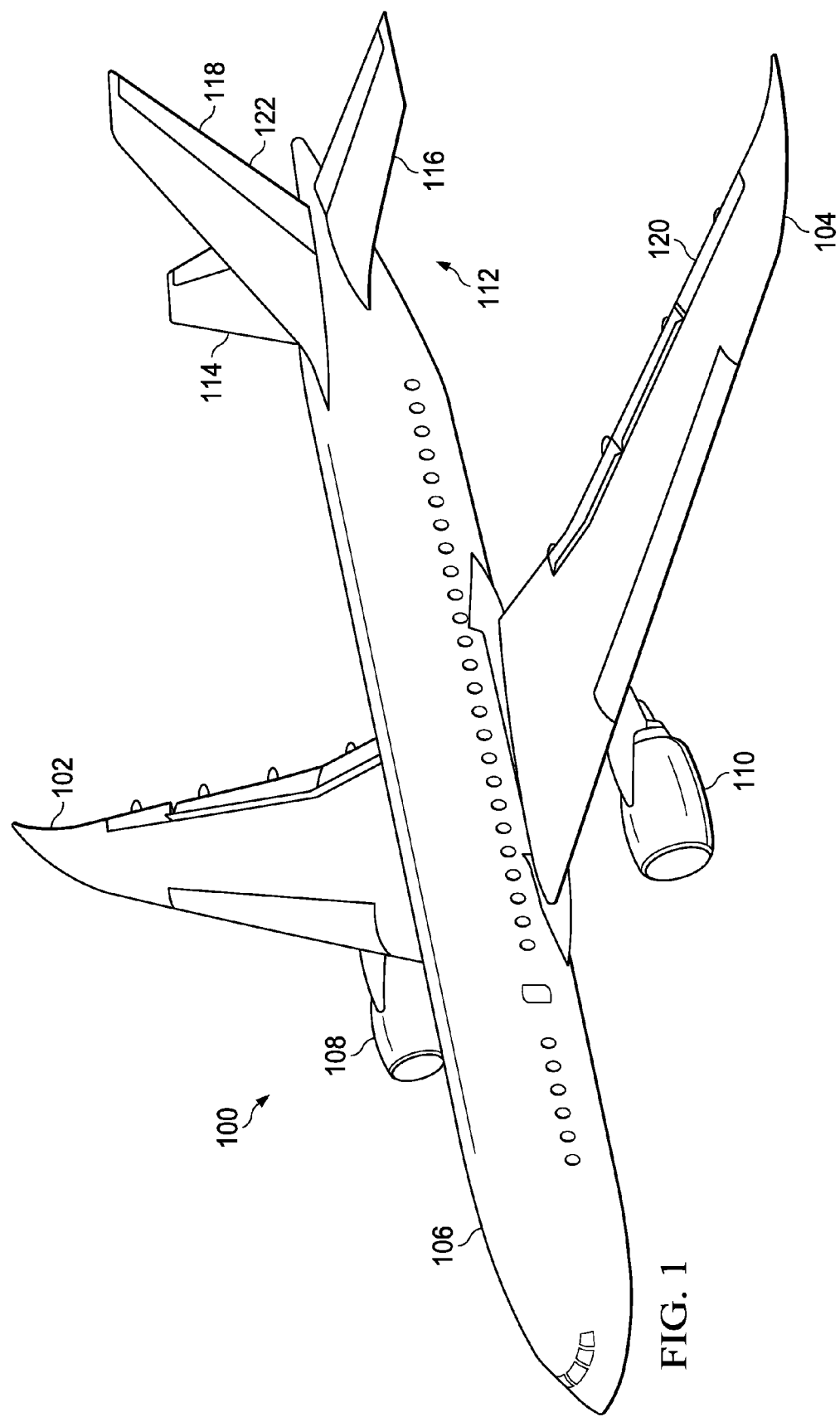
FIG. 1 is an illustration of an aircraft in accordance with an illustrative embodiment.

The illustrative embodiments recognize and take into account one or more different considerations. For example, the illustrative embodiments recognize and take into account that the use of buses, such as those used in computers, is becoming more common in aircraft. For example, flight control modules may send commands to actuator control modules to control devices in the aircraft. Actuator control modules may control, for example, a flight control surface, an engine, or some other suitable device in the aircraft. With these types of buses, the timing of when commands sent from a flight control module are received by an actuator control module for processing may not always occur as quickly as desired.

The illustrative embodiments recognize and take into account that a bus may be a parallel bus or a serial bus. When a parallel bus is used, units of data, such as a word, may be carried on multiple paths in the bus. Depending on the traffic and other conditions, the time needed for a unit of data to reach an actuator control module may take more time than desired.

As a result, a command from one flight control module may arrive later than a command from another flight control module for the same flight control surface. This type of delay results in a lack of congruency in the inputs to the actuator control module. The illustrative embodiments recognize and take into account that commands received in the inputs to the actuator control module may not provide a desired performance in the aircraft when the timing issues are present.

The illustrative embodiments recognize and take into account that when multiple flight control modules send commands to an actuator control module, the actuator control module may receive the command from each of the flight control modules at different times. Thus, the illustrative embodiments provide a method and apparatus for controlling flight control surfaces on an aircraft. In one illustrative embodiment, an apparatus comprises a data bus system, actuator control modules, and flight control modules. The data bus system is located in an aircraft. The actuator control modules are connected to the data bus system. An actuator control module in the actuator control modules controls positioning of a group of flight control surfaces on the aircraft using commands on the data bus system that are directed to the actuator control module. The flight control modules are connected to the data bus system. The flight control modules generate and send the commands onto the bus system to control the flight control surfaces on the aircraft. The commands for a flight control surface are directed towards a group of actuator control modules assigned to the flight control surfaces. The actuator control modules and the flight control modules determine whether an error is present in the commands sent onto the data bus system by the flight control modules.

A "group of," as used herein with reference to items, means one or more items. For example, a group of actuator control modules is one or more actuator control modules.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a flight control system may be implemented in accordance with an illustrative embodiment. The flight control system may control flight control surfaces on aircraft 100. For example, the flight control system may control the position of flap 120, rudder 122, or some other flight control surface on aircraft 100. The flight control system also may control the operation of engine 108 and engine 110.

Figure 2:
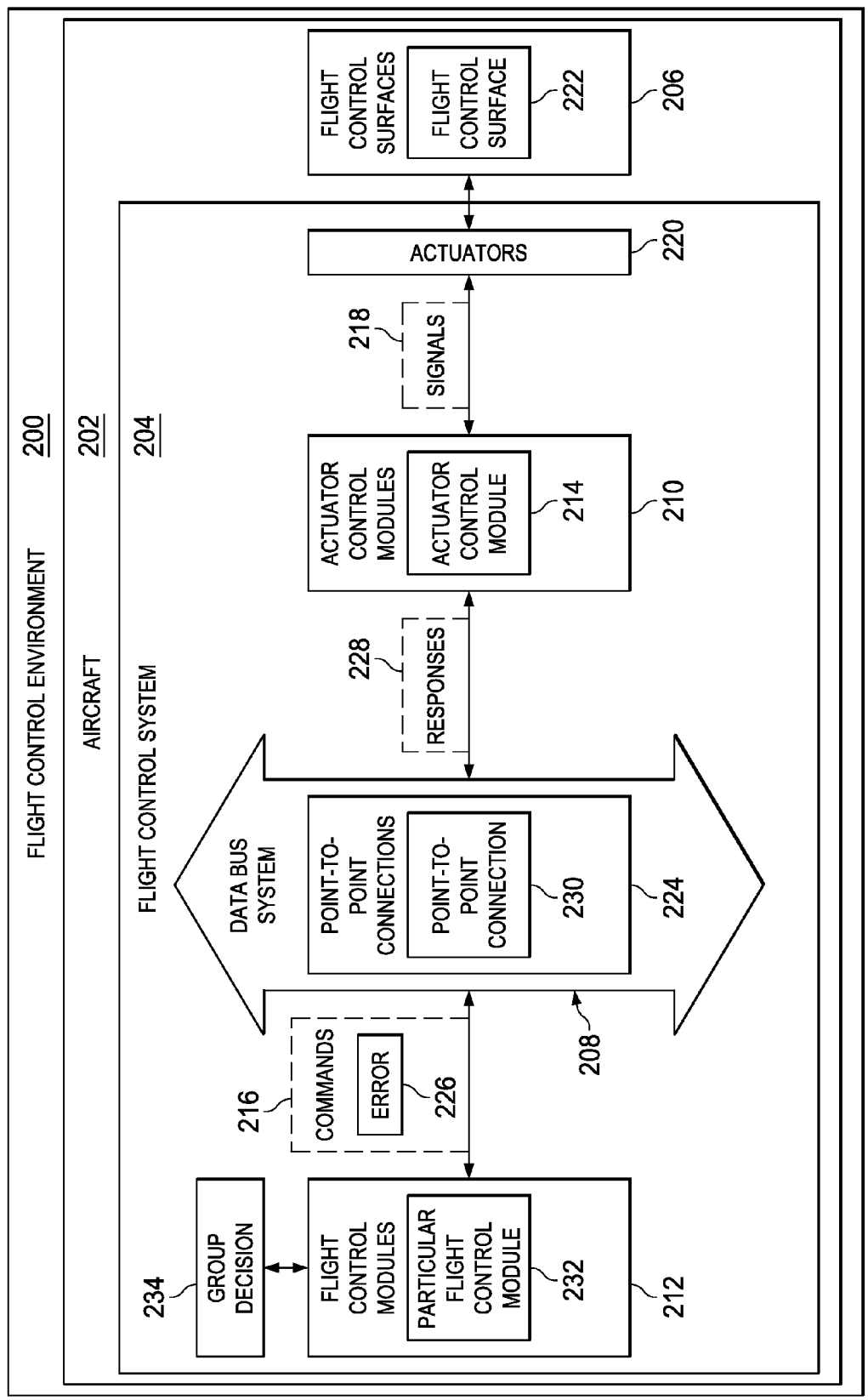
FIG. 2 is an illustration of a block diagram of a flight control environment in accordance with an illustrative embodiment.

Turning next to FIG. 2, an illustration of a block diagram of a flight control environment is depicted in accordance with an illustrative embodiment. In this depicted example, flight control environment 200 includes aircraft 202. Flight control system 204 in aircraft 202 controls the movement of aircraft 202. Flight control system 204 controls the operation of flight control surfaces 206.

In this illustrative example, flight control system 204 is a fly-by-wire system. As depicted, flight control system 204 includes data bus system 208, actuator control modules 210, and flight control modules 212.

Data bus system 208 is a group of buses. As depicted, data bus system 208 facilitates communication between actuator control modules 210 and flight control modules 212 that are connected to data bus system 208. Data bus system 208 may use any suitable architecture. For example, data bus system 208 may use architectures employed in computers. Data bus system 208 may provide communications to line replaceable units in addition to actuator control modules 210 and flight control modules 212. In this illustrative example, data bus system 208 provides a medium for sending information in parallel.

In the illustrative example, actuator control modules 210 are connected to data bus system 208. As depicted, actuator control module 214 in actuator control modules 210 controls positioning of a group of flight control surfaces 206 using commands 216 on data bus system 208 that are directed to actuator control module 214.

In other words, each of actuator control modules 210 may be used to control the positioning of one or more flight control surfaces 206. Further, a plurality of actuator control modules 210 are assigned to each of flight control surfaces 206. By assigning two or more of actuator control modules 210 redundancy is provided to control flight control surfaces 206.

For example, actuator control modules 210 send signals 218 to actuators 220. Actuators 220 in turn move flight control surfaces 206 to desired positions.

In the illustrative example, flight control modules 212 are connected to data bus system 208. Each of flight control modules 212 generates and sends commands 216 onto data bus system 208 to control flight control surfaces 206 on aircraft 202. Each of flight control modules 212 may generate commands 216 for all of flight control surfaces 206.

In the illustrative example, commands 216 for flight control surface 222 are directed towards actuator control modules 210 assigned to flight control surface 222. In other words, commands 216 are processed by actuator control modules 210 to move flight control surface 222 to a desired position.

Actuator control modules 210 and flight control modules 212 communicate over data bus system 208 using point-to-point connections 224. For example, flight control modules 212 send commands 216 onto data bus system 208 for use by one or more of actuator control modules 210.

As depicted, actuator control modules 210 and flight control modules 212 determine whether error 226 is present in commands 216 sent onto data bus system 208 by flight control modules 212. In these illustrative example, actuator control module 214 determines whether error 226 is present in commands 216 that are directed to actuator control module 214 for flight control surface 222. Other ones of actuator control modules 210 also may determine whether error 226 is present in commands 216 that are directed to actuator control module 214.

Error 226 may take different forms. Error 226 may occur through timing issues. The timing issues may be present when commands 216 are received late, out of sequence, or not received at all by actuator control module 214 when compared to the receipt of commands 216 from different ones of flight control modules 212. For example, error 226 may be present if the timing between commands 216 sent onto data bus system 208 by flight control modules 212 are received at different times in which those times are far enough apart to be undesired.

For example, if a command to move a control surface is received later than desired, moving the control surface at that time may cause undesired movement of aircraft 202. As a result, that command is considered to be error 226 because of the timing of when the command was received.

In one example, a window may start when the first command is received from a flight control module and have a selected period of time. If other commands to control the flight control surface received from other flight control modules are outside of the window, those commands may be considered to have error 226. In another illustrative example, error 226 may be present if a difference is present in values identified in commands for positions of an actuator, an amount of movement identified in commands for the actuator are different, or the difference is greater than a threshold between commands 216 sent to actuator control module 214 from flight control modules 212.

The results of the determinations made by actuator control modules 210 may be returned in responses 228. For example, actuator control modules 210 send responses 228 to commands 216 indicating whether error 226 has been identified as being present in commands 216 by actuator control modules 210. In the illustrative example, flight control modules 212 determine whether error 226 is present in commands 216 sent onto data bus system 208 based on at least one of commands 216 sent onto data bus system 208 or responses 228 to commands 216 sent by actuator control modules 210.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

In this illustrative example, flight control modules 212 receive responses 228 and may use responses 228 to determine whether error 226 is present. Further, flight control modules 212 also make their own determinations from examining commands 216 as to whether error 226 is present in addition to or in place of examining responses 228.

As depicted, communications between flight control modules 212 and actuator control modules 210 are managed based on error 226 identified as being present in commands 216 sent onto data bus system 208 by a group of flight control modules 212 when error 226 is identified in commands 216. In particular, the use of point-to-point connections 224 is managed based on the identification of error 226. Analysis of error 226 may indicate that point-to-point connection 230 in point-to-point connections 224 results in the receipt of errors that are greater than desired.

For example, flight control modules 212 determine whether to continue to use point-to-point connection 230 between particular flight control module 232 in flight control modules 212 and actuator control module 214 based on error 226 identified. In this illustrative example, the absence of point-to-point connection 230 may also result in particular flight control module 232 being unused by actuator control module 214 that communicates with particular flight control module 232 over point-to-point connection 230 having a greater than desired error level.

The management of point-to-point connections 224 may occur as group decision 234. For example, group decision 234 may be performed by flight control modules 212.

Flight control modules 212 may perform group decision 234 using various mechanisms. As one example, majority voting may be used by flight control modules 212. For example, flight control modules 212 may each evaluate received responses 228 from actuator control modules 210 over point-to-point connections 224 that identify whether error 226 is identified in commands 216. In this example, when error 226 is identified, each flight control module in flight control modules 212 may then make an individual vote regarding which point-to-point connection in point-to-point connections 224 caused error 226. Further in this example, group decision 234 as to the cause of error 226 may be based on majority vote of the flight control modules 212. As used herein, majority vote is at least one of greater than fifty (50) percent of the votes, or some other suitable percentage.

Thus, when errors are absent in the received commands, the commands are in congruence. As used herein, congruence of received commands means the commands were received within a desired period of time, no differences are present between the commands, and no other types of errors are present in the commands. For example, congruence between commands received in messages from flight control modules means the commands are received in the messages within the period of time for receiving the commands from the flight control modules, no differences are present between the received commands, and no other types of errors are present in the messages received from the flight control modules. In this manner, flight control system 204 may be an input congruence system for flight control surfaces 206 on aircraft 202.

Actuator control modules 210 and flight control modules 212 may be implemented in software, hardware, firmware or a combination thereof. When software is used, the operations performed by actuator control modules 210 and flight control modules 212 may be implemented in program code configured to run on hardware, such as a processor unit. When firmware is used, the operations performed by actuator control modules 210 and flight control modules 212 may be implemented in program code and data and stored in persistent memory to run on a processor unit. When hardware is employed, the hardware may include circuits that operate to perform the operations in actuator control modules 210 and flight control modules 212.

In the illustrative examples, the hardware for the processor units may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices that may be used for processor units include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, each of flight control modules 212 is comprised of processor units that are dissimilar to each other and each of actuator control modules 210 is comprised of processor units that are dissimilar to each other. For example, one processor unit in the module may be implemented using a computer microprocessor while the other processor in the module may be implemented using a digital signal processor. As another example, two computer microprocessors may be used having different processor architectures.

The illustration of flight control environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a portion of flight control system 204 may use conventional controls in addition to the fly-by-wire system. Further, flight control system 204 may control other types of devices other than flight control surfaces 206. For example, flight control system 204 also may control the engines on aircraft 202.

As yet another example, a network may be used in addition to or in place of data bus system 208 to provide communications between actuator control modules 210 and flight control modules 212. In still yet another example, group decision 234 may also be performed using actuator control modules 210 and flight control modules 212. Further, some number of flight control modules 212 may be used rather than all the modules in some illustrative examples.

In the illustrative example, only actuator control modules 210 send responses 228 to flight control modules 212. As another example, flight control modules 212 also may send responses 228 from making a determination as to whether error 226 is present in commands 216 sent to actuator control modules 210.

Figure 3:
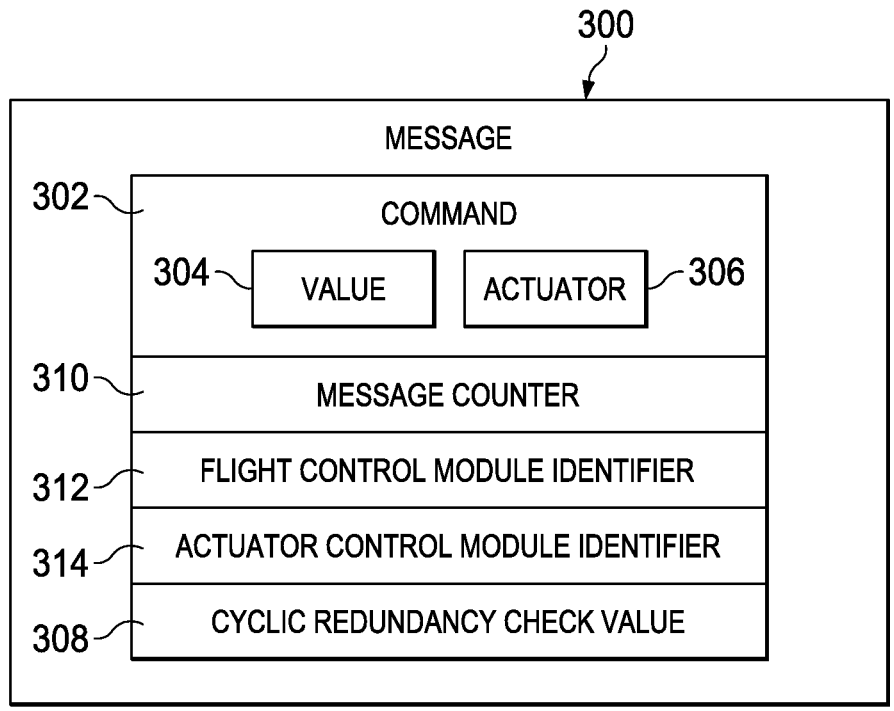
FIG. 3 is an illustration of a block diagram of a message in accordance with an illustrative embodiment.

With reference next to FIG. 3, an illustration of a block diagram of a message is depicted in accordance with an illustrative embodiment. As depicted, message 300 is an example of a message sent from a flight control module to an actuator control module that includes command 302. Command 302 in message 300 is an example of a command in commands 216 in FIG. 2. For example, command 302 may include value 304 identified in a signal from a flight control to send to actuator 306 to control a flight control surface. Actuator 306 is an example of an actuator in actuators 220 in FIG. 2.

In this illustrative example, message 300 includes a number of different fields. As depicted, message 300 includes command 302, message counter 310, flight control module identifier 312, actuator control module identifier 314, and cyclic redundancy check value 308.

Message counter 310 counts the number of messages that have been sent from a flight control module as identified by flight control module identifier 312 when message 300 is generated and sent by the flight control module. Actuator control module identifier 314 identifies an actuator control module that message 300 is being sent to. For example, actuator control module identifier 314 may be a final destination of message 300 where message 300 will be received.

As depicted, cyclic redundancy check (CRC) value 308 is used to ensure no errors are present in message 300 received by the actuator control module. Cyclic redundancy check value 308 is set before message 300 is sent over a connection between the flight control module and the actuator control module.

Figure 4:
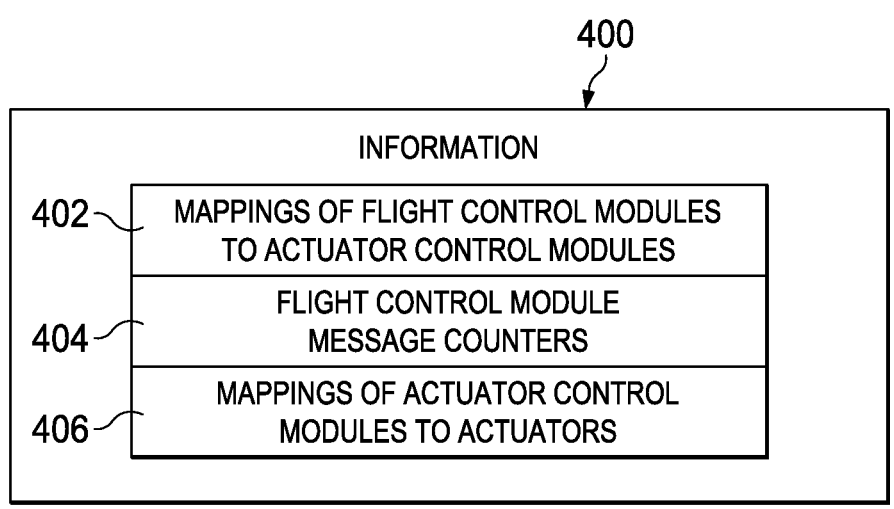
FIG. 4 is an illustration of a block diagram of information used by flight control modules and actuator control modules in the processing of commands in accordance with an illustrative embodiment.

Turning to FIG. 4, an illustration of a block diagram of information used by flight control modules and actuator control modules in the processing of commands is depicted in accordance with an illustrative embodiment. As depicted, information 400 includes a number of different fields for processing commands in flight control environment 200.

As depicted, information 400 includes a group of mappings of flight control modules to actuator control modules 402, a group of flight control module message counters 404, and a group of mappings of actuator control modules to actuators 406. The group of mappings of flight control modules to actuator control modules 402 identifies connections between multiple flight control modules and actuator control modules. When an error is present in commands sent using a connection identified by a mapping, the mapping is changed to exclude the connection. This change is present until maintenance can be performed in this illustrative example. Similarly, the group of mappings of actuator control modules to actuators 406 identifies connections between actuator control modules and actuators that control flight control surfaces.

In this illustrative example, the group of flight control module message counters 404 is used in messages sent between flight control modules and actuator control modules. The group of flight control module message counters 404 are used to indicate the sequence of messages sent from the flight control module.

Figure 5B:
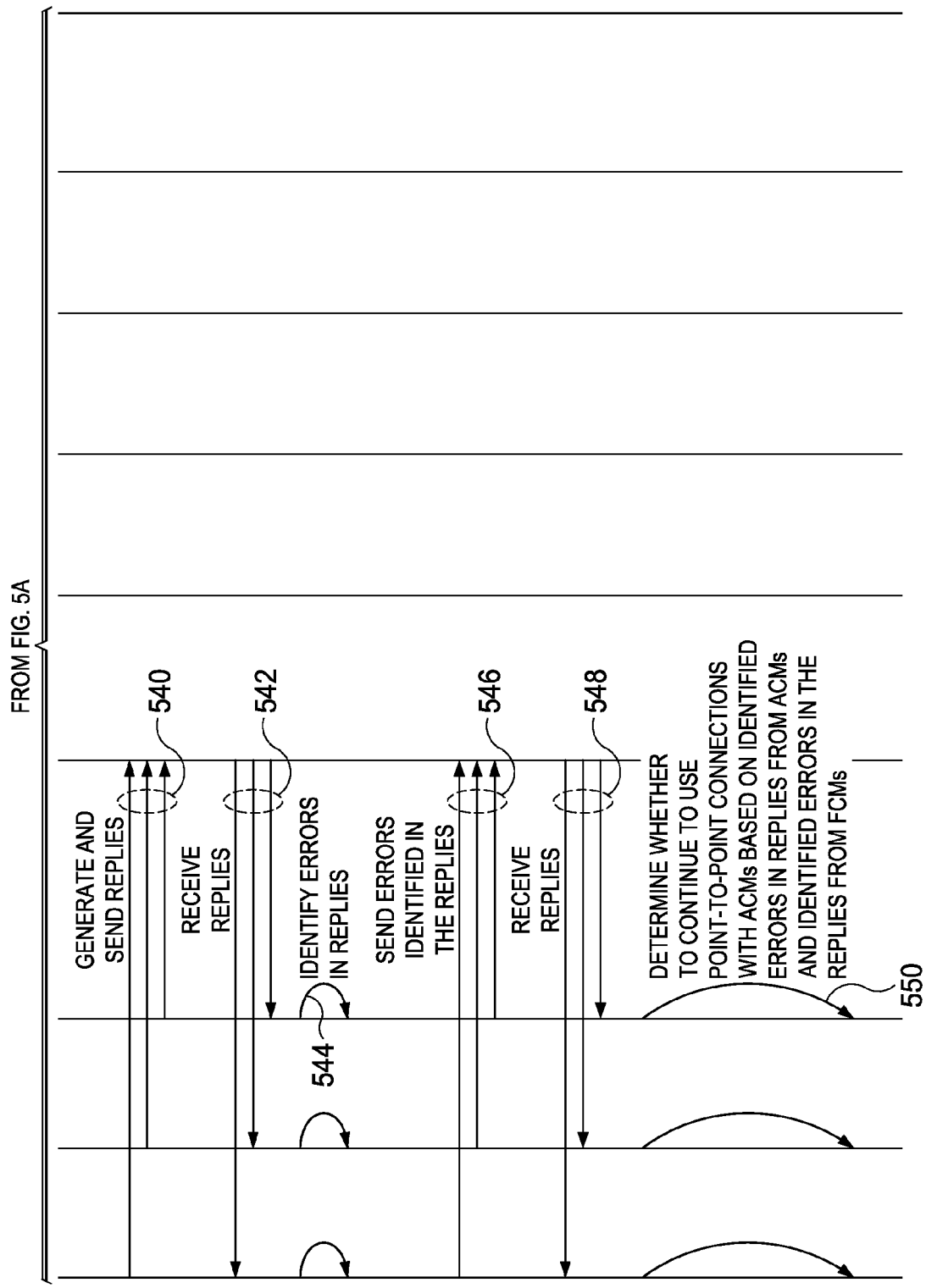

Turning next to FIGS. 5A and 5B, an illustration of a flowchart of a process for processing commands in a flight control environment is depicted in accordance with an illustrative embodiment. The process illustrated in FIGS. 5A and 5B may be implemented by flight control modules 212, actuator control modules 210, data bus system 208, and actuators 220 in flight control environment 200 in FIG. 2.

For example, flight control module 502, flight control module 504, and flight control module 506 are an example of multiple flight control modules in flight control modules 212 in FIG. 2 that receive signals from a flight control for controlling a flight control surface. Data bus system 508 is an example of data bus system 208 in FIG. 2. Actuator control module 510, actuator control module 512, actuator control module 514, and actuator control module 516 are an example of actuator control modules 210 in FIG. 2. Actuator 518 is an example of an actuator in actuators 220 in FIG. 2.

The process begins with flight control module 502, flight control module 504, and flight control module 506 generating and sending commands in messages to data bus system 508 (operation 520). In the illustrative example, each message sent in operation 520 includes a command generated by the flight control module based on a signal received at the flight control module. The messages may also include a flight control module identifier and an actuator control module identifier. For example, flight control module 502 may send a message that includes an actuator control module identifier that identifies actuator control module 510 and another message that identifies actuator control module 512.

The process receives the commands in the messages from data bus system 508 at actuator control module 510, actuator control module 512, actuator control module 514, and actuator control module 516 (operation 522). For example, actuator control module 510 may receive messages from data bus system 508 that have actuator control module 510 as a destination of the message. In this example, actuator control module identifiers in the received messages point to actuator control module 510. Further in this depicted example, the commands received in the messages at actuator control module 510 include an actuator identifier of an actuator assigned to actuator control module 510 in a group of mappings of actuator control modules to actuators.

The process next identifies whether errors are present in the commands based on the received messages (operation 524). For example, the process may determine whether an error is present in a command in operation 524 based on at least one of a difference between the command and other commands received in other messages, a cyclic redundancy value in the message is not correct, a message counter in the message is out of sequence, or some other suitable rule or standard for determining whether an error is present in a command.

The process then generates a signal at actuator control module 510 and sends the signal from actuator control module 510 to actuator 518 (operation 526). The process generates the signal at actuator control module 510 based on the commands in the messages received at actuator control module 510 including the actuator identifier of actuator 518 assigned to actuator control module 510 in the group of mappings of actuator control modules to actuators. The process next receives the signal at actuator 518 and operates the flight control surface based on the received signal (operation 528).

The process generates and sends replies for the messages the actuator control modules received to data bus system 508 (operation 530). The replies generated in operation 530 identify the flight control modules that sent the messages as final destinations of the replies and include any errors that the actuator control module may have identified in operation 524. The process next receives the replies at flight control module 502, flight control module 504, and flight control module 506 based on the final destinations identified in the replies (operation 532).

The process identifies errors included in the replies (operation 534). As depicted, after the process identifies errors included in the replies, the process next sends the identified errors included in the replies to other flight control modules in flight control module 502, flight control module 504, and flight control module 506 using data bus system 508 (operation 536). The process then receives the errors included in the replies from data bus system 508 at the other flight control modules (operation 538).

The process next generates and sends replies from the other flight control modules to data bus system 508 that include the errors the other flight control modules received from data bus system 508 (operation 540). The process receives the replies from data bus system 508 at flight control module 502, flight control module 504, and flight control module 506 (operation 542).

The process then identifies errors in the replies received from data bus system 508 (operation 544). The process next sends identified errors in the replies to the other flight control modules using data bus system 508 (operation 546). The process receives the replies at flight control module 502, flight control module 504, and flight control module 506 from data bus system 508 (operation 548).

The process then determines whether to continue to use point-to-point connections with actuator control modules based on identified errors in replies sent from ACMs and identified errors in the replies sent from FCMs (operation 550). When an error is identified in a point-to-point connection between a flight control module and an actuator control module, the identification of the error may be used to update mappings of flight control modules to actuator control modules. For example, the connection may be removed in the mappings for the duration of a flight of the aircraft.

Figure 6:
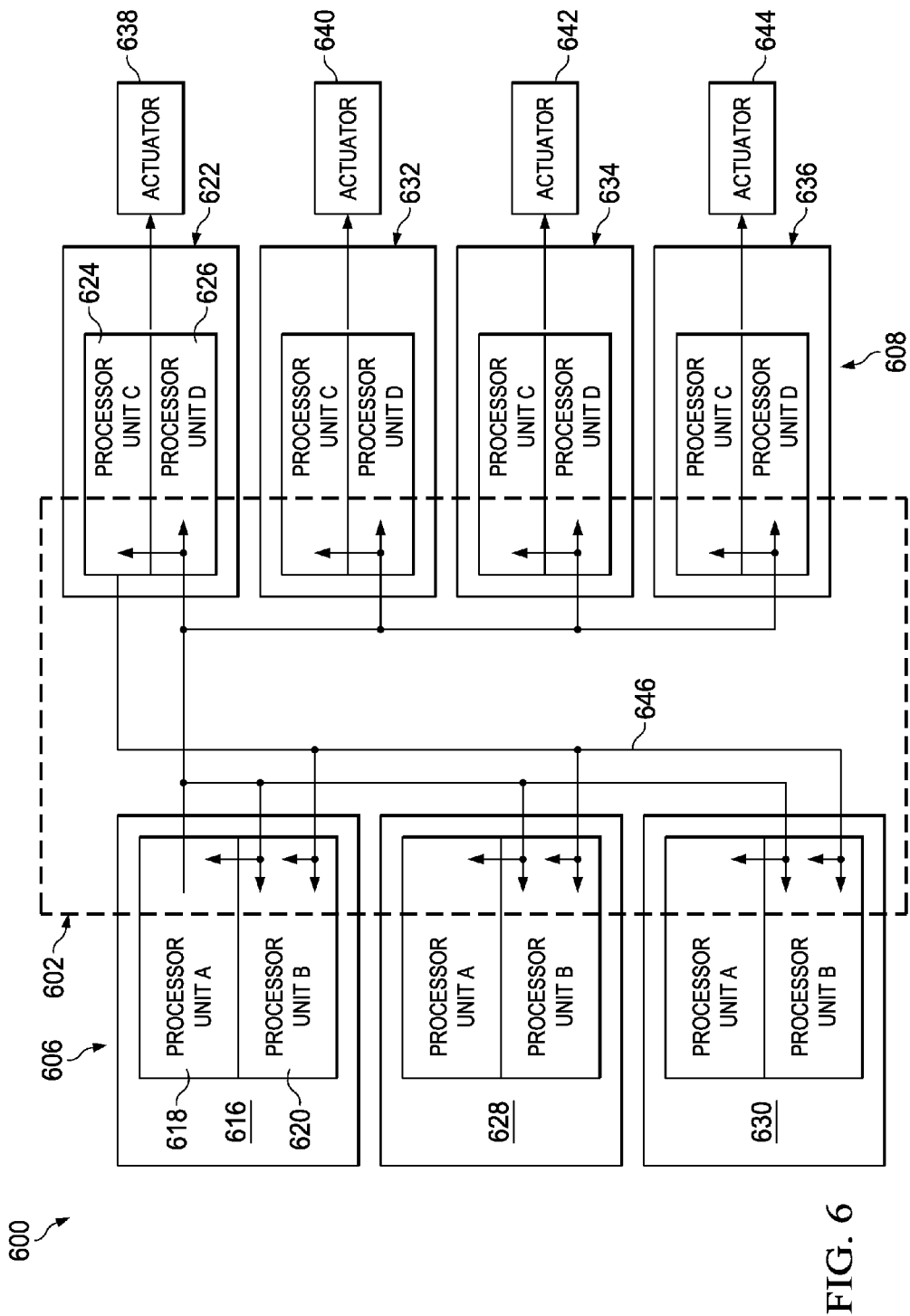
FIG. 6 is an illustration of a block diagram of components of a flight control environment in accordance with an illustrative embodiment.

With reference next to FIG. 6, an illustration of a block diagram of components of a flight control environment is depicted in accordance with an illustrative embodiment. As depicted, flight control environment 600 is an example of flight control environment 200 in FIG. 2.

In this illustrative example, flight control environment 600 includes data bus system 602. Data bus system 602 is an example of data bus system 208 in FIG. 2. Data bus system 602 is used for communications between flight control modules 606 and actuator control modules 608 in this illustrative example. Data bus system 602 is also used for communications between flight control modules 606 and other flight control modules in flight control modules 606 in this illustrative example.

As depicted, processor unit A 618 and processor unit B 620 form a plurality of processor units in flight control module 616. In the illustrated example, processor unit A 618 generates and sends commands to actuator control modules 608, and processor unit B 620 processes monitoring messages. For example, a monitoring message may be a reply sent from an actuator control module after receiving a command from flight control module 616.

In this illustrative example, processor unit C 624 and processor unit D 626 form a plurality of processor units in actuator control module 622. In the illustrated example, processor unit C 624 processes commands received from flight control modules 606, and processor unit D 626 identifies whether errors exist in commands and sends replies to flight control modules 606.

As depicted, flight control modules 606 include flight control module 616, flight control module 628, and flight control module 630. As also depicted, actuator control modules 608 include actuator control module 622, actuator control module 632, actuator control module 634, and actuator control module 636. In this illustrative example, actuator control module 622 is assigned to send signals to actuator 638; actuator control module 632 is assigned to send signals to actuator 640; actuator control module 634 is assigned to send signals to actuator 642; and actuator control module 636 is assigned to send signals to actuator 644.

Arrows 646 are a logical representation of point-to-point connections in data bus system 602, in this illustrative example. Arrows 646 do not show all of the connections used in data bus system 602 and also do not show all of the directions of flow of commands, replies, and other types of messages sent over connections in data bus system 602. Other arrows for the connections and other connections may also be included in data bus system 602.

Figure 7:
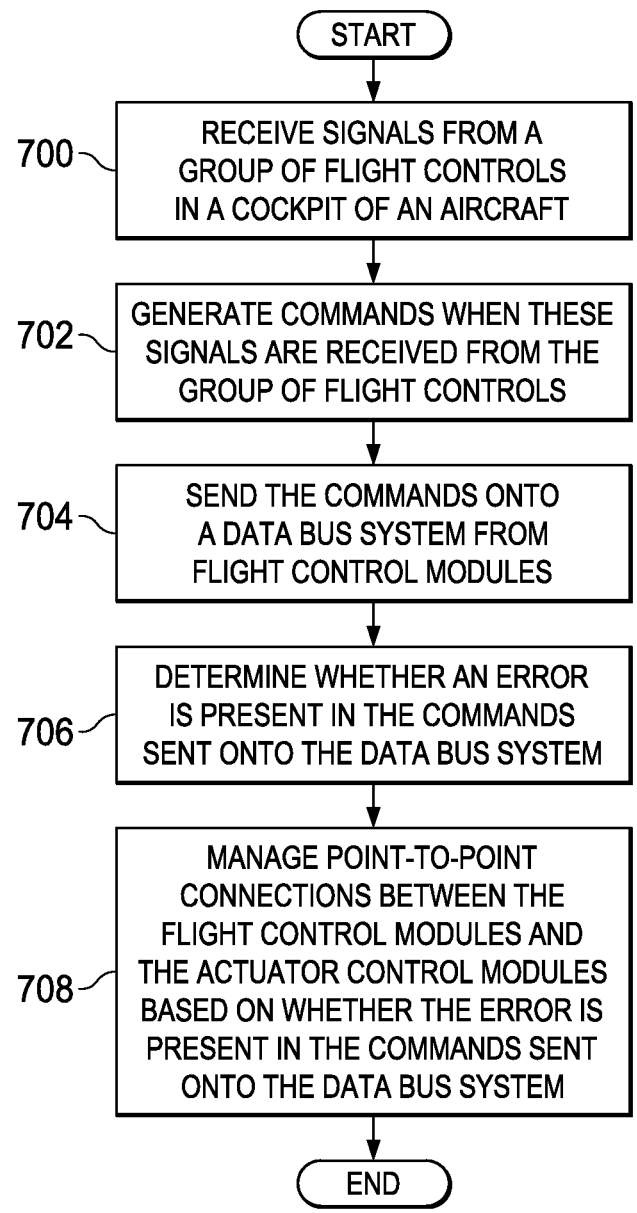
FIG. 7 is an illustration of a flowchart of a process for controlling flight control surfaces on an aircraft in accordance with an illustrative embodiment.

Turning next to FIG. 7, an illustration of a flowchart of a process for controlling flight control surfaces on an aircraft is depicted in accordance with an illustrative embodiment. The process illustrated in FIG. 7 may be implemented in flight control system 204 in FIG. 2

The process begins by receiving signals from a group of flight controls in a cockpit of an aircraft (operation 700). These signals may be analog signals, digital signals, or some combination thereof. These signals may be generated from flight controls such as a flight stick, rudder pedals, a throttle, or some other suitable type of control. As depicted, these flight controls may be controls operated by a pilot. In other illustrative examples, the flight controls may be devices sending sensor data or other information needed in the flight control modules to provide automatic adjustments to the flight of aircraft without input from the pilots.

The flight control modules generate commands when these signals are received from the group of flight controls (operation 702). The flight control modules then send the commands onto a data bus system from flight control modules (operation 704).

The flight control modules and the actuator control modules determine whether an error is present in the commands sent onto the data bus system (operation 706). The process manages point-to-point connections between the flight control modules and the actuator control modules based on whether the error is present in the commands sent onto the data bus system (operation 708), with the process terminating thereafter.

Figure 8:
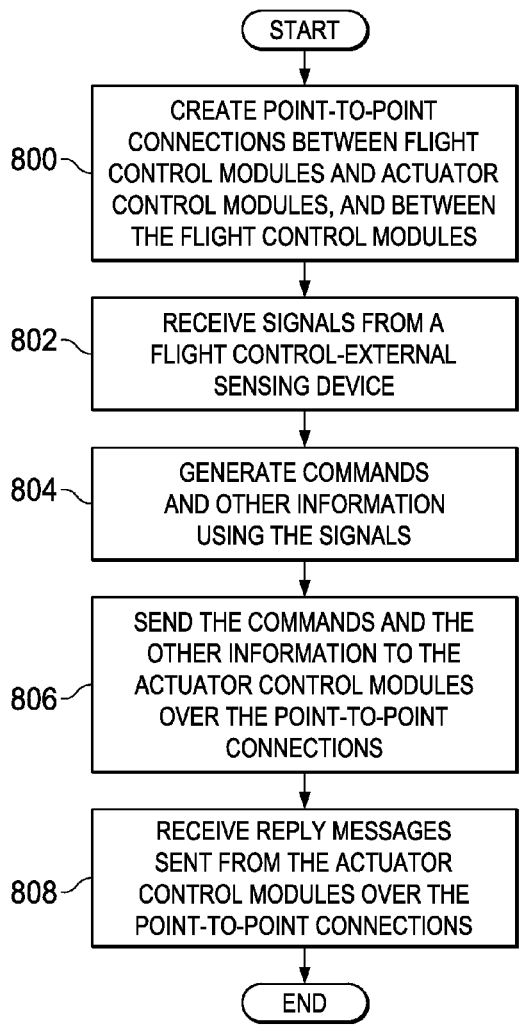
FIG. 8 is an illustration of a flowchart of a process for processing signals from a flight control in accordance with an illustrative embodiment.

Turning now to FIG. 8, an illustration of a flowchart of a process for processing signals from a flight control is depicted in accordance with an illustrative embodiment. The process illustrated in FIG. 8 may be implemented by flight control modules 212 in flight control system 204 in FIG. 2.

The process begins by creating point-to-point connections between flight control modules and actuator control modules, and between the flight control modules (operation 800). In this illustrative example, the point-to-point connections are similar to those in a data bus system in a computer using a point-to-point protocol. For example, a transmitter and a receiver of a flight control module may be used for sending and receiving messages over the data bus system using the point-to-point connections, and for creating the point-to-point connections.

The process receives signals from a flight control-external sensing device (operation 802). The signals received are for controlling a flight control surface. The process next generates commands and other information using the signals (operation 804). The other information may be selected from at least one of a cyclic redundancy check (CRC) value for the command, an identifier, or other suitable information. For example, the identifier may be a flight control module message counter indicating a sequence of commands sent in messages by a flight control module to an actuator control module. In this illustrative example, the flight control module message counter is incremented with each command sent in a message by the flight control module to the actuator control module.

The process sends the commands and the other information to the actuator control modules over the point-to-point connections (operation 806). For example, a flight control module may send the command and other information in messages to each of the actuator control modules that the flight control module has a point-to-point connection with.

The process then receives reply messages sent from the actuator control modules over the point-to-point connections (operation 808), with the process terminating thereafter. A received reply from an actuator control module indicates whether that actuator control module received the command sent by the flight control module and whether that actuator control module determined that an error is present in the command in the message that it received. Operations 802-808 may be repeated any number of times to process additional signals received from the flight control.

Figure 9:
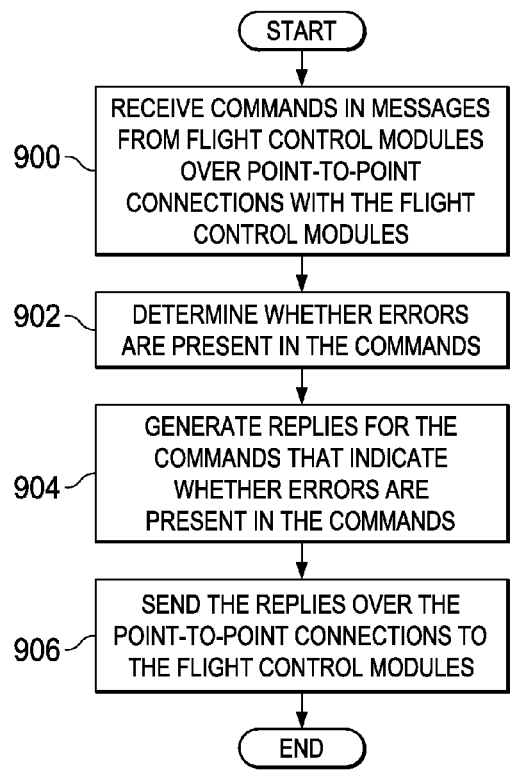
FIG. 9 is an illustration of a flowchart of a process for processing commands in accordance with an illustrative embodiment.

Turning now to FIG. 9, an illustration of a flowchart of a process for processing commands is depicted in accordance with an illustrative embodiment. The process illustrated in FIG. 9 may be implemented by actuator control module 214 in flight control system 204 in FIG. 2. For example, the process illustrated in FIG. 9 may be implemented by a processor unit in actuator control module 214.

The process begins by receiving commands in messages from flight control modules over point-to-point connections with the flight control modules (operation 900). The received commands may be a portion of the commands sent by the flight control modules in operation 808 in FIG. 8. For example, there may be a problem with one of the point-to-point connections.

The process determines whether errors are present in the commands (operation 902). For example, the process may determine whether an error is present in a received command based on a difference between the received command and other received commands.

The process next generates replies for the commands that indicate whether errors are present in the commands (operation 904). The process then sends the replies over the point-to-point connections to the flight control modules (operation 906), with the process terminating thereafter. The replies are received by flight control modules in operation 808 in FIG. 8. Operations 900-906 may be repeated any number of times to process additional commands received from flight control modules.

Figure 10:
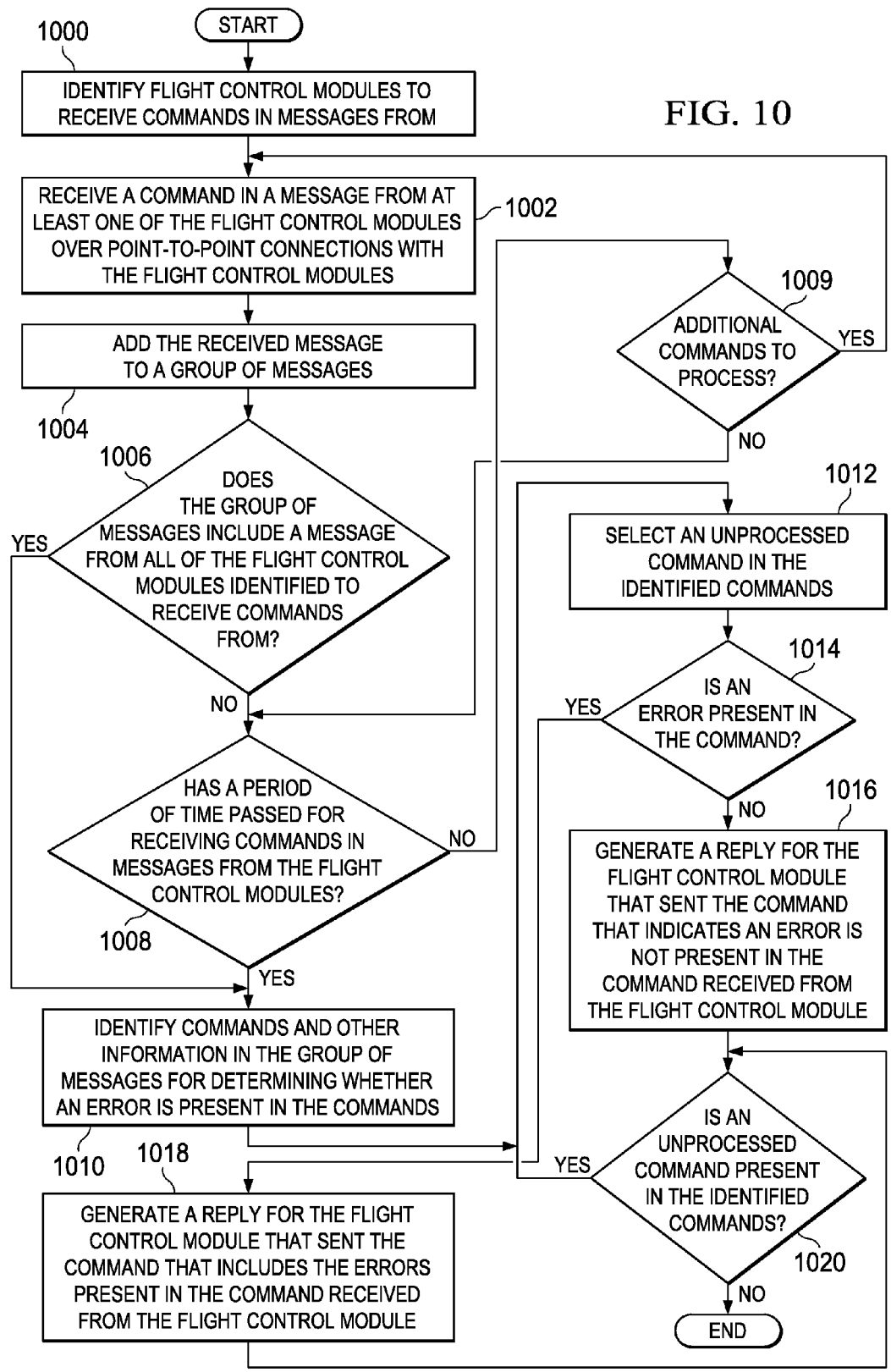
FIG. 10 is an illustration of a flowchart of a process for determining whether an error is present in commands received in messages from flight control modules in accordance with an illustrative embodiment.

Turning now to FIG. 10, an illustration of a flowchart of a process for determining whether an error is present in commands received in messages from flight control modules is depicted in accordance with an illustrative embodiment. The process illustrated in FIG. 10 may be implemented by actuator control module 214 in flight control system 204 in FIG. 2. The operations in this process are an example of operations to perform operations 900-904 in FIG. 9.

The process begins by identifying flight control modules to receive commands in messages from (operation 1000). For example, the flight control modules to receive commands in messages from may be based on a group of mappings of flight control modules to actuator control modules.

The process receives a command in a message from at least one of the flight control modules over point-to-point connections with the flight control modules (operation 1002). The process adds the received message to a group of messages (operation 1004).

The process next determines whether the group of messages includes a message from all of the flight control modules identified to receive commands from (operation 1006). As depicted, when the group of messages does not include a message from all of the flight control modules identified to receive commands from, the process next determines whether a period of time has passed for receiving commands in messages from the flight control modules (operation 1008).

As depicted, when the period of time has not passed for receiving commands in messages from the flight control modules, the process determines whether additional commands to process are present (operation 1009). As depicted, when additional commands are present for processing, the process continues to operation 1002. Otherwise, the process continues to operation 1008.

Further, when the group of messages include a message from all of the flight control modules identified to receive commands from in operation 1006 or when the period of time has passed for receiving commands in messages from the flight control modules in operation 1008, the process then identifies commands and other information in the group of messages for determining whether an error is present in the commands (operation 1010). The other information may include cyclic redundancy check values, message counters, and other suitable types of information for use in determining whether errors are present in the command.

The process then selects an unprocessed command in the identified commands (operation 1012). The process determines whether an error is present in the command (operation 1014). The error is present when at least one of a cyclic redundancy check value in the other information for the command is incorrect, the counter in the other information for the command is out of sequence, or other suitable reasons.

For example, the process may calculate cyclic redundancy check values for the group of messages and compare the calculated cyclic redundancy check values to the identified cyclic redundancy check values to determine whether an error is present in the commands. As another example, the process may compare the identified message counters with flight control module message counters.

As another example, the messages may be encoded using encoding schemes selected from at least one of parity bits, Manchester encoding, or other suitable encoding schemes. In this example, when the message is decoded using the selected encoding scheme, the decoding process of the encoding scheme identifies any errors that may have occurred in transmission of the message.

As depicted, when no errors are present in the command, the process generates a reply for the flight control module that sent the command that indicates an error is not present in the command received from the flight control module (operation 1016). When errors are present in the command, the process generates a reply for the flight control module that sent the command that includes the errors present in the command received from the flight control module (operation 1018).

The process next determines whether an unprocessed command is present in the identified commands (operation 1020). When an unprocessed command is present in the identified commands, the process returns to operation 1012. The process terminates when the identified commands have been processed.

Figure 11:
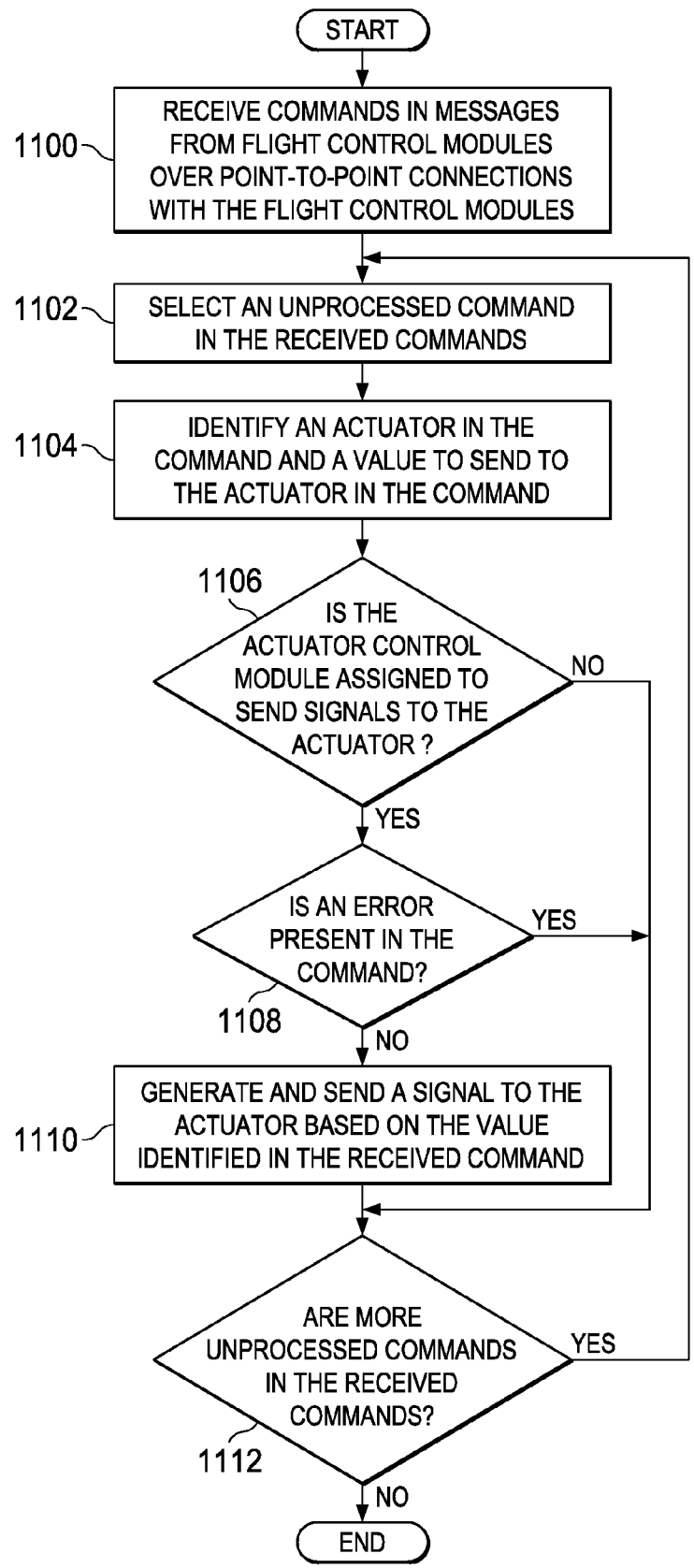
FIG. 11 is an illustration of a flowchart of a process for processing commands in accordance with an illustrative embodiment.

Turning now to FIG. 11, an illustration of a flowchart of a process for processing commands is depicted in accordance with an illustrative embodiment. The process illustrated in FIG. 11 may be implemented by actuator control module 214 in flight control system 204 in FIG. 2. For example, the process illustrated in FIG. 11 may be implemented by a processor unit in actuator control module 214.

The process begins by receiving commands in messages from flight control modules over point-to-point connections with the flight control modules (operation 1100). The process selects an unprocessed command in the received commands (operation 1102). The process also identifies an actuator in the command and a value to send to the actuator in the command (operation 1104).

The process next determines whether the actuator control module is assigned to send signals to the actuator (operation 1106). For example, the process may determine whether the actuator control module is assigned to send signals to the actuator based on a group of mappings of actuator control modules to actuators. When the actuator control module is not assigned to send signals to the actuator identified in the command, the process continues to operation 1112.

As depicted, when the actuator control module is assigned to send signals to the actuator, the process next determines if an error is present in the command (operation 1108). For example, the processor unit implementing operation 1108 may use the determinations from another processor unit in the actuator control module that implemented operation 902 in FIG. 9.

As also depicted, when the process determines no errors are present in the command and the actuator control module is assigned to send signals to the actuator identified in the command, the process next generates and sends a signal to the actuator based on the value identified in the received command (operation 1110). The process then determines whether more unprocessed commands are in the received commands (operation 1112). As depicted, when all of the received commands have not been processed, the process continues to operation 1102. When all of the received commands have been processed, the process terminates. Operations 1100-1112 may be repeated any number of times to process additional commands received from flight control modules.

Figure 12B:
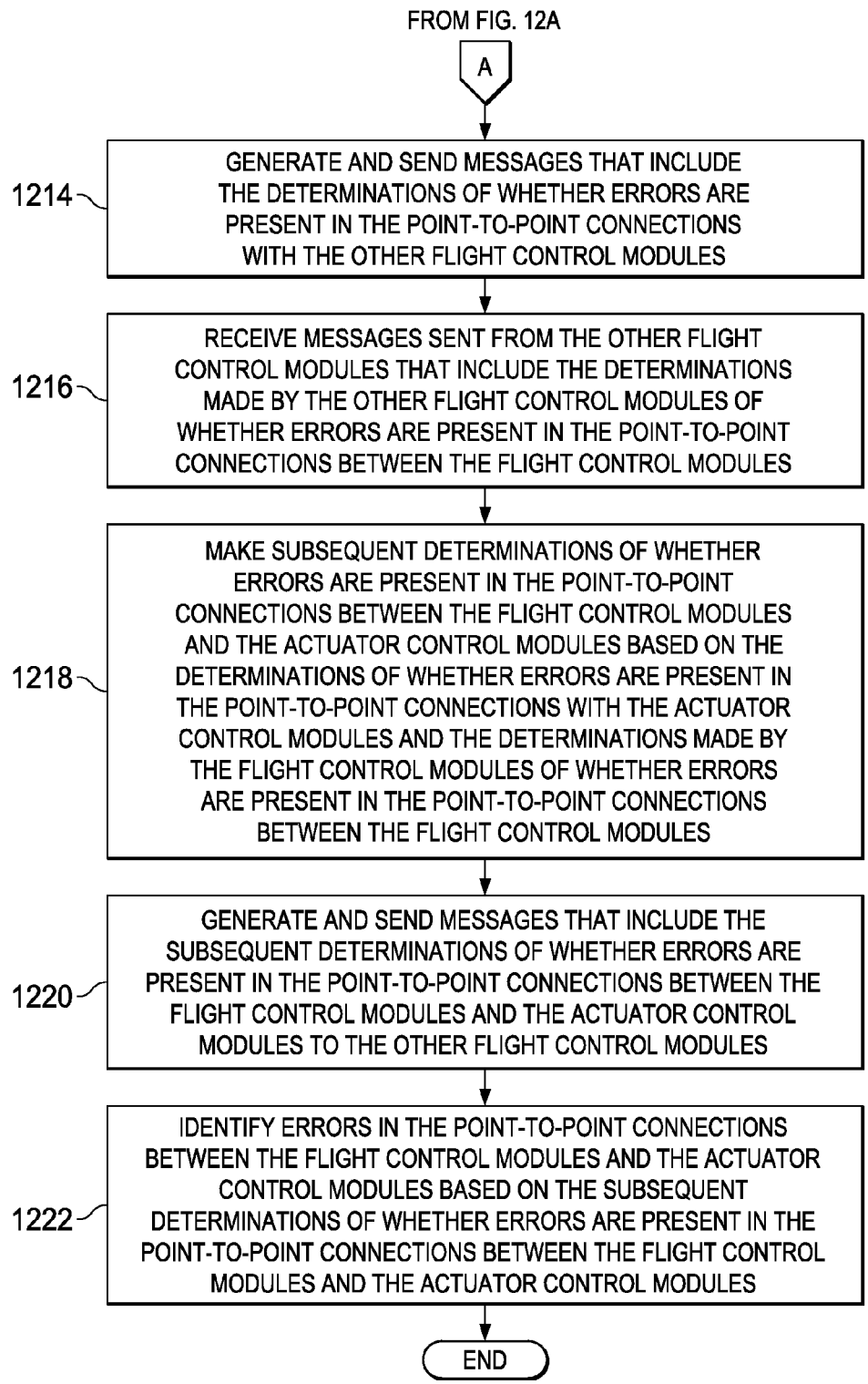

Turning now to FIGS. 12A and 12B, an illustration of a flowchart of a process for identifying whether errors are present in a flight control system is depicted in accordance with an illustrative embodiment. The process illustrated in FIGS. 12A and 12B is implemented by flight control modules 212 in flight control system 204 in FIG. 2. For example, the process illustrated in FIGS. 12A and 12B may be implemented by processor units in flight control modules 212. In this example, the processor units in flight control modules 212 may execute the operations in FIGS. 12A and 12B in parallel. The operations in FIGS. 12A and 12B are described from the point of view of a flight control module of multiple flight control modules that process signals from a flight control for a flight control surface.

The process begins by receiving replies from actuator control modules over point-to-point connections the flight control module has with the actuator control modules (operation 1200). Each reply indicates whether that actuator control module received a command in a message sent by the flight control module and whether that actuator control module determined that an error is present in the command that it received from the flight control module.

The process next makes determinations of whether errors are present for the point-to-point connections with the actuator control modules based on the replies received from the actuator control modules (operation 1202). The determination of whether errors are present in the point-to-point connection with an actuator control module involves all of the components of the point-to-point connection. These components include at least one of a transmitter of the flight control module, the data bus system, a receiver of the actuator control module, a transmitter of the actuator control module, or other suitable types of components of the point-to-point connection. The error is present when at least one of the replies is not received from the actuator control module over the point-to-point connection, the reply includes the determination that an error is present in the command the actuator control module received, or when another type of error is received indicating the point-to-point connection is bad.

The process generates a message that includes the determinations of whether errors are present in the point-to-point connections with the actuator control modules (operation 1204). The process sends the message generated to other flight control modules in the flight control system using point-to-point connections between the flight control modules (operation 1206). The flight control module and the other flight control modules are multiple flight control modules that process signals from a flight control for a flight control surface.

The process next receives messages generated by the other flight control modules that include the determinations that the other flight control modules made of whether errors are present in the point-to-point connections between the other flight control modules and the actuator control modules (operation 1208). The process sends replies to each of the messages that the flight control module received from the other flight control modules (operation 1210).

The process then makes determinations of whether errors are present in the point-to-point connections with the other flight control modules (operation 1212). The determination of whether errors are present in a point-to-point connection with another flight control module involves all of the components used to send and receive a message over the point-to-point connection. These components include at least one of a transmitter of the flight control module, the data bus system, a receiver of the flight control module, a transmitter of the other flight control module, a receiver of the other flight control module, or other suitable types of the point-to-point connection. An error is present in a point-to-point connection with another flight control module when at least one of the reply message is not received from the other flight control module over the point-to-point connection or when another type of error is received indicating the point-to-point connection is bad.

The process generates and sends messages that include the determinations of whether errors are present in the point-to-point connections with the other flight control modules (operation 1214). The process next receives messages sent from the other flight control modules that include the determinations made by the other flight control modules of whether errors are present in the point-to-point connections between the flight control modules (operation 1216).

The process makes subsequent determinations of whether errors are present in the point-to-point connections between the flight control modules and the actuator control modules based on the determinations of whether errors are present in the point-to-point connections with the actuator control modules and the determinations made by the flight control modules of whether errors are present in the point-to-point connections between the flight control modules (operation 1218). The process generates and sends messages that include the subsequent determinations of whether errors are present in the point-to-point connections between the flight control modules and the actuator control modules to the other flight control modules (operation 1220).

The process then identifies errors in the point-to-point connections between the flight control modules and the actuator control modules based on the subsequent determinations of whether errors are present in the point-to-point connections between the flight control modules and the actuator control modules (operation 1222), with the process terminating thereafter. When an error is identified in a point-to-point connection between a flight control module and an actuator control module, the error may be used to update mappings of flight control modules to actuator control modules. For example, the point-to-point connection may be removed in the mappings for the duration of a flight of the aircraft.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 13:
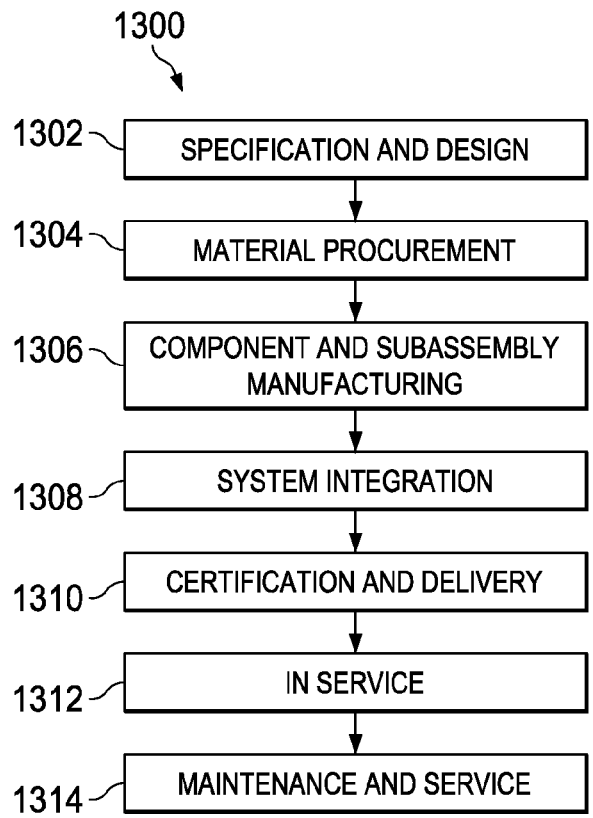
FIG. 13 is an illustration of a block diagram of an aircraft manufacturing and service method in accordance with an illustrative embodiment.
Figure 14:
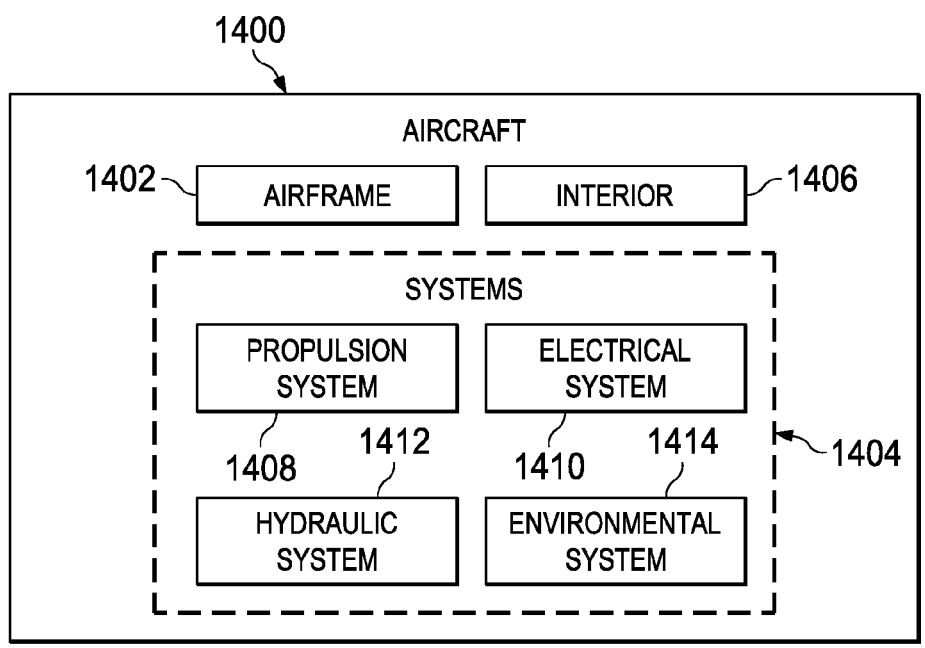
FIG. 14 is an illustration of a block diagram of an aircraft in which an illustrative embodiment may be implemented.

The illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 1300 in FIG. 13. One or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

Thus, the illustrative embodiments provide a method and apparatus for managing commands for flight control surfaces. One or more illustrative embodiments may use fly-by-wire systems for aircraft. The flight control system implemented in accordance with an illustrative embodiment may provide input data congruency with respect to commands that are processed in a flight control system.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a data bus system in an aircraft;
actuator control modules connected to the data bus system;
an actuator control module, in the actuator control modules, configured to control a position of a flight control device, configured to control movement of the aircraft, based upon commands on the data bus system directed to the actuator control module; and
flight control modules connected to the data bus system and configured to:
generate the commands that control the flight control device, the commands being directed towards a group of actuator control modules assigned to the flight control device;
send the commands, to the flight control device, via point-to-point connection mappings designated by the flight control modules;
determine whether an error is present in the commands sent onto the data bus system by the flight control modules; and
responsive to a determination of the error, designate an alternate point-to-point connection mapping for subsequent commands, such that, via alternate point-to-point connection mapping, the subsequent commands reach the flight control device error free.

2. The apparatus of claim 1, wherein communications between the flight control modules and the actuator control modules are managed based on the error identified as being present in the commands sent onto the data bus system by a group of the flight control modules.

3. The apparatus of claim 2, wherein the flight control modules determine whether to continue to use a point-to-point connection between two flight control modules based on the error.

4. The apparatus of claim 1, further comprising the point-to-point connection mappings configured to comprise the data bus system.

5. The apparatus of claim 1, wherein the actuator control modules send responses to the commands indicating whether the error has been identified, by the actuator control modules, as being present in the commands.

6. The apparatus of claim 5, wherein the flight control modules determine whether the error is present in the commands sent onto the data bus system based on at least one of the commands sent onto the data bus system or the responses to the commands sent by the actuator control modules.

7. The apparatus of claim 1, further comprising the actuator control modules configured to send signals to actuators that move the flight control device and wherein a plurality of actuator control modules are assigned to the flight control device.

8. The apparatus of claim 1, wherein each of the flight control modules comprises processor units that are dissimilar to any processor unit in any flight control module in the flight control modules and each actuator control module of the actuator control modules comprises a processor unit dissimilar to a processor unit in any of the actuator control modules.

9. The apparatus of claim 8, wherein any processor unit is selected from one of a microprocessor, a digital signal processor, a circuit system, an integrated circuit, an application specific integrated circuit (ASIC), a programmable logic device, a programmable logic array, a programmable array logic, a field programmable logic array, and a field programmable gate array.

10. A flight control system comprising:
a data bus system in an aircraft;
actuator control modules connected to the data bus system;
an actuator control module, in the actuator control modules, configured to control a position of a flight control device, configured to control movement of the aircraft, based upon commands on the data bus system directed to the actuator control module; and
flight control modules connected to the data bus system, and configured to:
generate the commands control the flight control device on the aircraft, the commands being directed towards actuator control modules assigned to the flight control device;
send the commands to the flight control device via point-to-point connection mappings designated by the flight control modules;
determine whether an error is present in the commands sent onto the data bus system; and
responsive to a determination of the error, designate an alternate point-to-point connection mapping for subsequent commands to reach the flight control device error free.

11. The flight control system of claim 10 further comprising:
actuators that move the flight control device based upon signals sent to the actuators from the actuator control modules and wherein a plurality of actuator control modules are assigned to each of the flight control device.

12. The flight control system of claim 11, wherein the actuator control modules send responses to the commands indicating whether the error has been identified, by the actuator control modules, as being present in the commands by the actuator control modules.

13. The flight control system of claim 12, wherein the flight control modules determine whether the error is present in the commands sent onto the data bus system based on at least one of: the commands sent onto the data bus, and the responses to the commands sent by the actuator control modules.

14. The flight control system of claim 11, wherein each of the flight control modules is comprised of processor units that are dissimilar to each other and each of the actuator control modules is comprised of processor units that are dissimilar to each other further comprising the point-to-point connection mappings configured to comprise the data bus system using point-to-point connections.

15. A method for controlling a flight control device on an aircraft, the method comprising:
a flight control module determining a point-to-point connection mapping for sending a command to an actuator control module;
sending commands onto a data bus system from the flight control module;
determining, by the flight control module and actuator control module, whether an error is present in the commands sent onto the data bus system;
using a determination of the error, the flight control module determining an alternative point-to-point connection mapping between the flight control module and the actuator control module, such that the commands reach the actuator control module error free via the alternative point-to-point connection mapping.

16. The method of claim 15 further comprising:
controlling, by the actuator control modules, positioning of a group of flight control devices on the aircraft based on whether the error is present in the commands as determined by the flight control modules and the actuator control modules.

17. The method of claim 15 further comprising:
determining whether to continue to use a point-to-point connection between a particular flight control module and a different flight control module in the flight control modules based on the error.

18. The method of claim 17, further comprising:
determining whether to continue to use the point-to-point connection between the flight control module and the actuator control module based on analysis, from a plurality of flight control modules, of the error.

19. The method of claim 15 further comprising:
sending responses to the commands from the actuator control modules onto the data bus system, wherein the responses indicate whether the error has been identified as being present in the commands by the actuator control modules.

20. The method of claim 15, wherein each of the flight control modules in the flight control modules is comprised of processor units that are dissimilar to each other and each of the actuator control modules is comprised of processor units that are dissimilar to each other.

* * * * *

UNITED STATES PATENT AND TRADEMARK OFFICE
CERTIFICATE OF CORRECTION

PATENT NO. : 9,533,752 B2  
APPLICATION NO. : 14/332514  
DATED : January 3, 2017  
INVENTOR(S) : Yeh Page 1 of 1

It is certified that error appears in the above-identified patent and that said Letters Patent is hereby corrected as shown below:

In the Claims

Column 19, Line 34, Claim 10 change "commands control" to read --commands that control--
Column 19, Line 52, Claim 11 change "assigned to each of the flight control" to read --assigned to the flight control--

Signed and Sealed this
Ninth Day of October, 2018

Andrei Iancu
*Director of the United States Patent and Trademark Office*